Jan. 19, 1943. T. R. HARRISON 2,308,687
MEASURING INSTRUMENT
Original Filed May 20, 1936 2 Sheets-Sheet 1

INVENTOR.
THOMAS R. HARRISON
BY George M. [signature]
ATTORNEY.

Jan. 19, 1943. T. R. HARRISON 2,308,687
MEASURING INSTRUMENT
Original Filed May 20, 1936 2 Sheets-Sheet 2
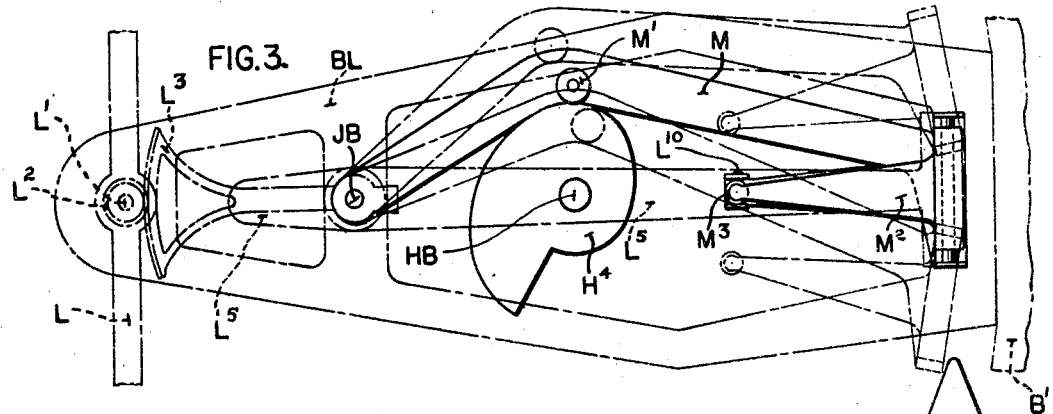
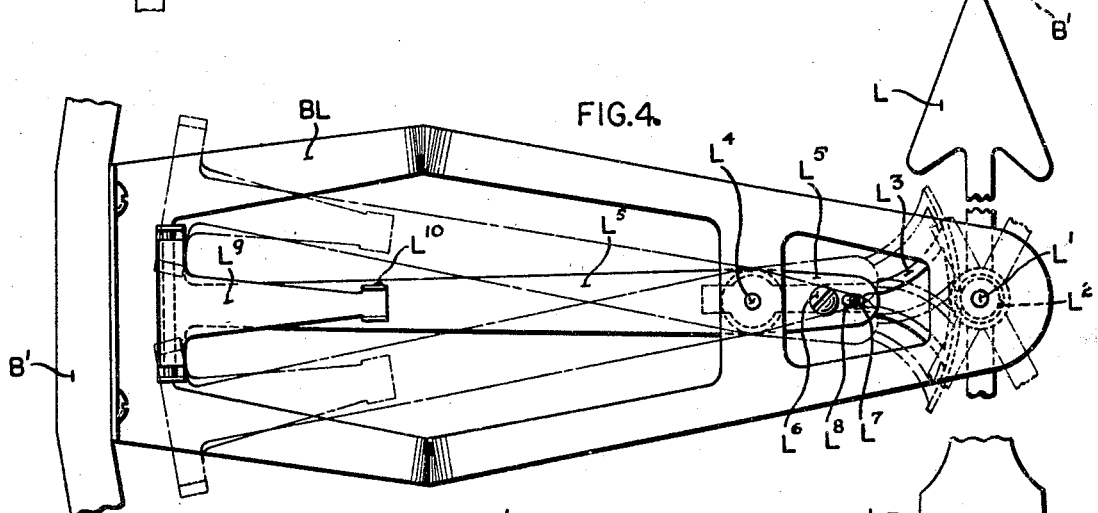
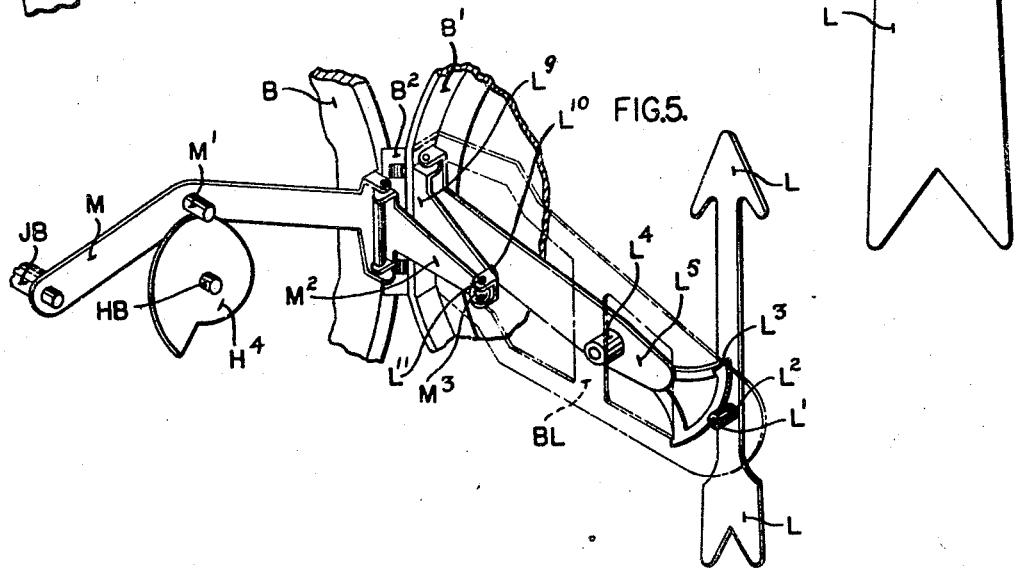
INVENTOR
THOMAS R. HARRISON
BY *George M. (signature)*
ATTORNEY Patented Jan. 19, 1943

2,308,687

UNITED STATES PATENT OFFICE 2,308,687

MEASURING INSTRUMENT

Thomas R. Harrison, Wyncote, Pa., assignor to The Brown Instrument Company, Philadelphia, Pa., a corporation of Pennsylvania Original application May 20, 1936, Serial No. 80,708, now Patent No. 2,246,679, dated June 24, 1941. Divided and this application January 11, 1940, Serial No. 313,315

6 Claims. (Cl. 171—95)

The present invention relates to measuring instruments, and particularly to measuring instruments of the self-balancing potentiometric type, including exhibiting means that may be either indicating or recording or both indicating and recording means, for exhibiting the varying values of a measurable potential difference, such as voltage of a thermo-couple responsive to a variable temperature. In lieu of, or more usually, in addition to its exhibiting means, such an instrument may include control provisions.

This application is a division of my copending application Serial Number 80,708, filed May 20, 1936, now U. S. Patent 2,246,679, granted June 24, 1941, which application is concerned more particularly with the mechanical relay provisions of the instrument and the combination of the mechanical relay with the recording and/or indicating provisions of the instrument. The present application is concerned with details of the connection between the measuring means and the exhibiting means that is provided to indicate the value of the temperature or other condition that is being measured.

The improvements constituting the present invention were especially devised for use in instruments of the circular chart type, though some of the features of the present invention are not restricted to such use.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 3 is an elevation as seen from the front of the instrument, of parts of the instrument different from those shown therein;

Fig. 4 is an elevation of parts seen from the inner side of the casing door, which are carried by said door and cooperating with parts shown in Fig. 3;

Fig. 5 is a perspective view of parts shown in Figs. 3 and 4 with the casing door in its open position.

Figure 6:
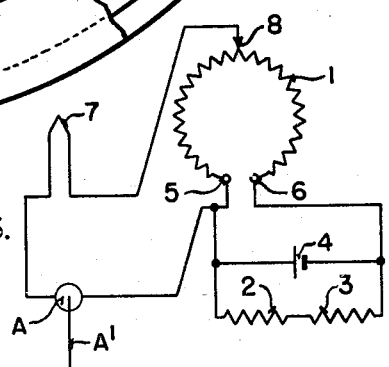
Fig. 6 is a diagram of one form of potentiometer circuit for the instrument shown in Fig. 1.

The potentiometer circuit shown in Fig. 6 comprises a slide wire resistance 1 and other resistances 2 and 3, and a circuit energizing dry cell or other source of constant potential 4, for maintaining a predetermined potential drop between the terminals 5 and 6 of the slide wire resistance 1. A galvanometer A has one terminal connected to the terminal 5, and has its second terminal connected to one terminal of a thermocouple 7. The other terminal of the thermocouple is connected to a contact 8 in sliding engagement with the slide wire resistance 1, and the position of which along the length of the resistance 1, is varied by the angular adjustment of an element H (Fig. 1), which carries the contact 8 and is mounted for angular adjustment on a shaft HB about which the slide wire 1 is circularly curved. By suitable angular adjustments of the element H, the contact 8 may be so positioned that the drop of potential through the portion of the slide wire resistance between the terminal 5 and the contact 8 is exactly equal and opposite to the electromotive force of the thermocouple 7, in which case the galvanometer pointer A' will occupy its neutral or zero position. Since the voltage drop through the portion of the slide wire resistance between the point 5 and contact 8 is proportional to the length of that portion, when the pointer A' is in its neutral position, the angular position of the member H is a measure of the thermocouple voltage.

Figure 1:
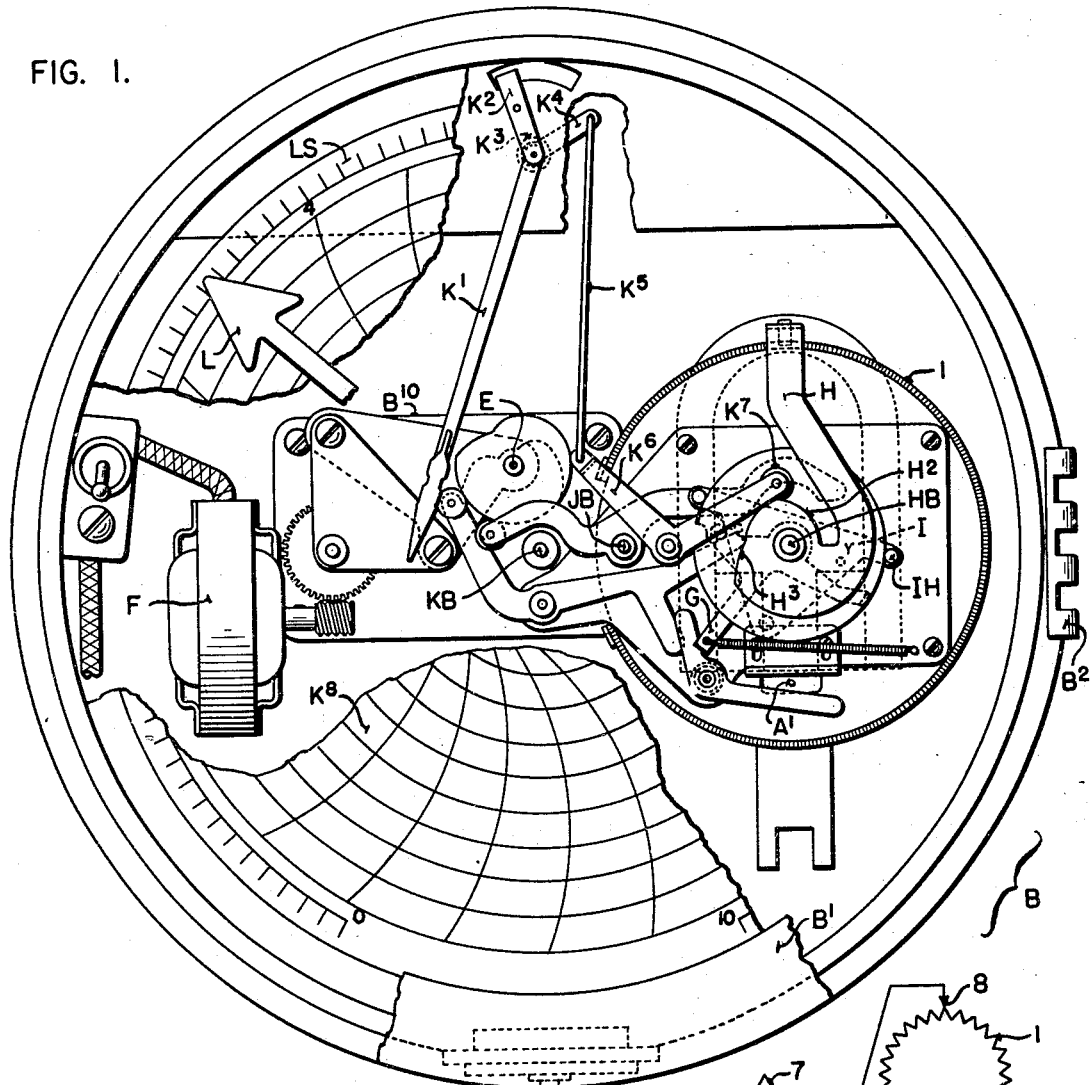
Fig. 1 is a front elevation of an indicating and recording instrument with parts broken away and in section.

The instrument shown in Fig. 1 includes parts corresponding to all those shown diagrammatically in Fig. 6, except the thermocouple and the circuit connections thereto, and includes, in addition, mechanical relay provisions, controlled by the deflection of the galvanometer pointer A', for periodically adjusting the contact 8 as required to rebalance the measuring circuit, when the latter is unbalanced as a result of a variation in the thermocouple voltage, and also includes provisions controlled and actuated by the angular position of the element H for indicating and recording the varying values of the thermocouple voltage. In respect to its general operating characteristics just mentioned, the instrument shown in Fig. 1 does not differ from prior self-balancing potentiometer instruments, but in respect to the form and character both of its rebalancing and its indicating and recording provisions, the instrument shown in the drawings differs from, and comprises improvements over previously known potentiometer instruments.

In the instrument shown in the drawings, all of the instrument parts are normally contained within an instrument casing comprising a cylindrical body B with a closed rear end and an open front end, and a front cover or door B' connected to the body B at one side of the casing by a hinge B². Most of the instrument parts are supported by the casing body, but some of the indicating parts are mounted on the casing door B', and are moved away from the other instrument parts when the casing door is turned into its open position, as is shown in Fig. 5.

Preparatory to a more detailed description of the mechanism, it is noted that the instrument illustrated includes means for periodically clamping the galvanometer pointer A' in whatever deflective position it may then occupy, and for moving a feeler or gauging member G into a position of engagement with the clamped pointer A' which is selectively dependent on the deflective position of the latter, and for adjusting a clutch device I into an operative position relative to the element H, dependent upon the selective position of the feeler member G when in engagement with the clamped pointer A', and for then angularly adjusting the element H through the clutch device I to an extent and in a direction selectively dependent upon the position into which the device I has been adjusted by the feeler G. The element H includes cam surfaces H³ and H² through which the angular movements of the element give suitable corresponding movements to levers K⁶ and L⁵ through which a pen arm K' and an indicating pointer L are suitably adjusted to record and indicate the existing value of the thermocouple voltage. A continuously operating relay motor F rotates a cam shaft E parallel to, but laterally displaced from the shaft HB, to thereby effect cyclic operations relatively timed of the pointer clamping mechanism, the feeler G, device I, and through the latter the element H.

A further detailed description of the relay mechanism is believed to be unnecessary herein since it is fully described in the parent application 80,708, above mentioned. It is sufficient to state that the shaft HB is cyclically rotated to positions corresponding to the value of the condition being measured and that the indicating means is adjusted therefrom in a manner now to be described.

The recording provisions of the instrument shown in the drawings, comprise a circular chart K⁸ at the front of the instrument carried by a chart driving member KB mounted in the frame member B¹⁰ and forming a part of the power unit which is slowly rotated by the motor F, and a pen arm K' in front of the chart. The arm K' is carried in a well known manner through a yoke K² by an oscillating member K³ back of the chart and having an operating arm K⁴ connected by a link K⁵ to a lever K⁶ carrying a roller K⁷ engaging a suitably shaped cam edge portion H³ of the element H. As the angular position of the element H is varied, in accordance with changes in the thermocouple voltage or other quantity measured, the cam edge H² correspondingly turns the lever K⁶ and the pen arm K', so that the latter records the value of the quantity measured on the chart K⁸.

In many cases, it is desirable that an instrument of the character disclosed should give a visual indicating of the value of the quantity measured, which is more easily read than the indication furnished by the angular position of the pen arm K'. For instance, if the instrument is used to measure some temperature or other condition of boiler operation, it is ordinarily desirable that the instrument should furnish an indication of the current value of the quantity measured which can be visually observed from various points or stations in the boiler room. To provide such an indication, the instrument shown comprises a pointer L, actuated through suitable means by the element H to indicate the value of the quantity measured, on a circular scale LS carried by the instrument adjacent the periphery of the chart K.

The means shown, through which the pointer L is moved, comprises a lever M, which is back of the chart K⁸, and is conveniently pivoted, as shown, on the shaft JB, and carries a pin M' engaging a cam part of the element H. As will be apparent, the cam part engaged by the pin M', may be the cam edge H² through which the pen arm K' is moved, but, to permit the use of different scale arrangements, as hereinafter described, the lever M may well be given its movements by a separate cam H⁴, as shown in Fig. 3.

The pointer L is in front of the chart K⁸, and in accordance with the present invention, is preferably mounted on the casing door for movement away from the chart when the door is opened, so as not to interfere with the replacement or adjustment of the chart. As shown, the pointer L is journalled on a supporting stud or shaft L' carried by a bracket BL rigidly attached to the rim or frame of the casing door B' adjacent the hinge connection B² for the latter. When the scale LS extends circularly about the axis of the chart driving member KB, as shown, the pivot L' may well be mounted in the bracket BL, so as to be coaxial, or substantially so, with the member KB when the door B' is in its closed position. Rigidly secured to the pointer L is a pinion L² in mesh with a gear segment L³ secured to the adjacent end of a lever L⁵ pivoted on the bracket BL at L⁴ by eccentric adjusting and clamping means including screws L⁶ and L⁷ and a slot L⁸ in the arm L⁵. The pivot L⁴ is coaxial with the shaft JB when the casing door B' is in its closed position. As the lever L⁵ is rotated between its two dotted line positions shown in Fig. 4, the indicating end of the pointer L is moved along the scale LS from one end to the other of the latter.

The end of the lever L⁵ remote from the pinion L², and the end of the lever M remote from its supporting shaft JB, extend into proximity with the hinge connection B², and are connected by a flexible connection, which extends past the edge of the chart K⁸ and through which angular movements of the lever M about the supporting shaft JB, give corresponding angular movements to the lever L⁵ when the door B' is in its closed position, and which accommodates the relative movements of the two levers occurring when the door B' is moved between its closed and open positions.

In the form shown, the said flexible connection comprises an arm L⁹ pivotally connected to the lever L⁵, an arm M² pivotally connected to lever M, and a universal joint connection between the two arms, the axis of the pivotal connection between each arm and the lever to which it is connected being substantially transverse to the length of the lever. The universal joint, in the form shown, comprises a ball M³ rigidly connected to the free end of the arm M² and held between transverse projections L¹⁰ from the arm L⁹ at its free end, which are formed with small apertures L¹¹ to receive diametrically opposed portions of the ball M³.

The means described for giving their respective movements to the pen arm K' and indicator arm L, are simple and effective from the mechanical standpoint, and the manner in which the indicator pointer L is mounted and actuated, is especially desirable because it permits of a pointer length as great as the chart diameter, without interfering with chart adjustments or replacements.

Furthermore, the means through which the pen arm K' and the pointer L are given their movements, make it readily feasible to give to the movements of each, the particular scale values most desirable from the practical standpoint for any given use of the instrument. The contour of the cam edge H² shown in Fig. 1, is such as to progressively move the pen arm K' outwardly from the center to the periphery of the chart K⁸ as the value of the quantity measured increases and the contact 8 is correspondingly adjusted in the counter-clockwise direction. If the movement of the pen from its initial central position on the chart to the periphery of the latter, corresponds to the movement of the contact 8, as the value of the quantity measured increases from zero to its maximum value, the record produced is what is sometimes referred to as a full scale record.

Figure 2:
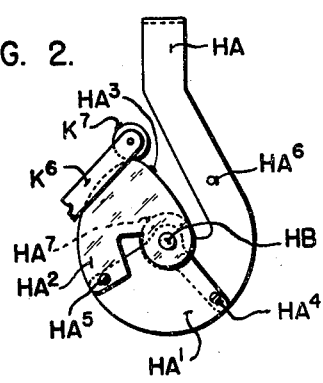
Fig. 2 is an elevation illustrating a modification in a portion of the instrument shown in Fig. 1.

In some cases, however, what is known as a "suppressed scale" record is practically desirable, and is obtainable with a simple modification of the apparatus shown in Fig. 1. For example, if the part of the element H carrying the cam edge H² shown in Fig. 1, is replaced by a part HA and cam parts HA' and HA² detachably connected thereto, as shown in Fig. 2, a suppressed scale record will be produced as a result of the contour of the cam edge collectively formed by the parts HA, HA' and HA², and engaging the pen arm actuating lever roller K⁷. As is plainly apparent in Fig. 2, all portions of the edge engaged by the pen actuating lever roller K⁷ collectively formed by the parts HA, HA' and HA², are parts of a circular arc concentric with the shaft HB, except the edge portion HA³ of the part HA². The edge portion HA³ is shaped and disposed to move the pen arm from the central portion of the chart to its periphery, as the value of the quantity measured increases from zero to a certain predetermined value much smaller than the value of the quantity corresponding to the full angular movement of the element H. As the quantity increases in value above said predetermined value, the position of the pen arm, then at the periphery of the chart, will not change. The record thus produced is commonly referred to as a suppressed scale record.

Instead of suppressing the record except for values of the quantity measured between zero and said predetermined value, some other record portion or portions may be suppressed. For example, if with the apparatus shown in Fig. 2 the part HA' is removed, and the part HA² is adjusted counter-clockwise relative to the part HA, so that it may be secured to the latter by the screw HA⁴ with the latter passing through the screw hole HA⁵ in the part HA², the pen actuating lever roller K⁷ will then move along the hub portion HA⁷ of the part HA as the quantity measured increases from zero to a certain intermediate value, and if the hub portion is concentric with the shaft HB, the pen arm will be at its minimum value position on the chart for values below said intermediate value. As the value increases from said intermediate value to a second intermediate value, and the roller K⁷ moves along the cam edge HA³, the pen arm will move from its zero value position on the chart to the periphery of the latter, and thereafter, as the quantity measured continues to increase in value, the pen arm will remain at the periphery of the chart. With the arrangement just described, the record of the value of the quantity measured is suppressed, except for values between the two intermediate values mentioned.

If with the part HA' removed, the part HA² is secured with the screw hole HA⁵ in register with the screw hole HA⁶ of the part HA, only values of the quantity measured between its maximum value and a certain intermediate value will be recorded.

Which scale portion or portions of the record are advantageously suppressed in any given case, will depend upon conditions of use. The increased accuracy and ease of reading of the record obtainable with the suppressed scale effect, are plainly apparent, since the effect of moving the pen entirely across the chart for a portion only of the full range of variation in value of the quantity measured, is to "open" the record formed or, stated differently, is to increase the distance between two scale marks representing two successive scale units.

Instead of totally suppressing some portion or portions of the scale, it may be desirable in some cases to make the contour of the controlling cam such as to open up the scale for a certain and practically important fraction of the range of value variation and correspondingly closing but not entirely suppressing the scale of another portion or portions of the range of value variations. This result is secured with the cam edge H² shown in Fig. 1, which has its edge so shaped that a portion H³ thereof, engaging the roller K⁷ during the angular movement of the element H through a relatively small intermediate portion of its total range of movement, is adapted to give the pen arm a major portion of its movement between the central portion and periphery of the chart K⁸. With the parts so arranged, the initial and final portions of the movement of the pen arm from the central portion to the periphery of the chart will actually record the corresponding variations in the value of the quantity measured, but will record those variations in accordance with a scale much closer or smaller than the scale of the record formed while the roller K⁷ engages the cam edge portion H³.

The suppressed scale effect is desirable in indicating, as well as in recording, values of the quantity measured. For example, if it be assumed that the instrument shown were intended to measure a furnace temperature varying from a minimum of zero to a maximum of 1200°, but which under all normal operating conditions varies only between a minimum of 800° and a maximum of 1000°, there would be an obvious advantage, in some cases, in shaping the cam H⁴ so that the pointer L is moved from one end to the other of the scale LS, as the temperature varies between 800° and 1000°. In some cases, there would be an especial advantage in obtaining such a suppressed scale indication by the pointer L, while obtaining a full scale record by the use of a cam, such as the cam edge $H^2$, progressively advancing the pen arm from the central portion to the periphery of the chart as the value of the quantity measured varies from zero to its maximum value. Similarly, in some cases it may be desirable to obtain a full scale indication of the entire change in value of the quantity measured, while recording the varying values of the quantity through a portion only of its total range of variation.

Whether or not the suppressed scale effect is obtained, with the means for adjusting either the pen arm or the pointer L, the described means for giving the pen arm and pointer their movements as the element H is adjusted, are desirable because of their simplicity and effectiveness and because they permit of the ready use of cam contours making the deflections of either pen arm or pointer linearly proportional to the changes in value of the quantity measured, even though that value is not in linear proportion to the angular movement of the member H occurring as the measured quantity changes in value.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. A measuring instrument comprising a casing including a casing body having a front opening, a door normally closing said opening, a hinge connection between said body and door at one side of said opening, exhibiting means including a lever mounted on said door at the inner side of the latter to turn about an axis at a distance from said hinge connection, one end of said lever being adjacent said hinge connection, measuring means within said casing body including a part adjacent said hinge connection and adapted for movement in the general direction of the axis of said connection in accordance with variations in the value of the quantity measured, and a flexible connection between said part and lever end adapted to accommodate bodily movement of said lever relative to said part when the door is moved away from, and returned to its closed position and through which when the door is in its closed position the said movements of said part give corresponding movements about said axis to said lever.

2. A measuring instrument comprising a casing including a casing body having a front opening, a door normally closing said opening, a hinge connection between said body and door at one side of said opening, exhibiting means including a lever mounted on said door at the inner side of the latter to turn about an axis at a distance from said hinge connection, one end of said lever being adjacent said hinge connection, measuring means within said casing body including a part adjacent said hinge connection and adapted for movement in the general direction of the axis of said connection in accordance with variations in the value of the quantity measured, and a flexible connection between said part and lever end adapted to accommodate bodily movement of said lever relative to said part when the door is moved away from, and returned to its closed position and through which, when the door is in its closed position, movements of said part give corresponding angular movements about said axis to said lever, a pointer pivotally mounted on said door at the inner side of the latter, and an operating connection between said lever and pointer through which said angular lever movements give said pointer angular movements proportional to, but of greater magnitude than the movements of said lever.

3. In an instrument adapted to measure and exhibit the value of a variable condition comprising a casing, a door for said casing hinged thereto, measuring means located in said casing, an exhibiting member movably mounted upon said door to be moved with said door as the door is opened or closed, and mechanism operative to move said exhibiting member in response to measurements made by said measuring means.

4. In a measuring instrument, the combination of a casing, measuring means located in said casing, a door for said casing provided with a window, an exhibiting element pivotally attached to the interior of said door to be visible through said window, means to hinge said door upon said casing, and drive means between said measuring means and exhibiting element, said drive means being provided with a hinge portion whereby said drive connection is not broken as the door is moved around its hinge relation to the casing.

5. In a measuring instrument, the combination of an instrument casing, measuring means located therein, a door for said casing hinged thereto, said door being provided with a window, an exhibiting element, means to mount said element upon the interior of said door and for rotative movement relative thereto, said element being visible through said window, connecting means between said measuring means and said element whereby the latter is moved in proportion to measurements made by the former, and hinge means forming part of said drive means, the hinge means being located near the door hinge so that the two will work together.

6. In an instrument adapted to measure and exhibit the value of a variable condition, the combination of an instrument casing having a measuring means located therein, a door for said casing, hinges to support said door on the casing, an exhibiting element to indicate the value of the condition as measured by the measuring means mounted for movement on the door, and jointed drive means between said measuring means and said element whereby the latter may be driven by the former in any position of said door.

THOMAS R. HARRISON.